US009399149B2

(12) United States Patent
Rose

(10) Patent No.: US 9,399,149 B2
(45) Date of Patent: Jul. 26, 2016

(54) FLEXIBLE FITTING FOR HEAT EXCHANGING GARMENTS

(75) Inventor: Joseph L. Rose, Pembroke (CA)

(73) Assignee: Flight Suits, El Cajon, CA (US)

( * ) Notice: Subject to any disclaimer, the term of this patent is extended or adjusted under 35 U.S.C. 154(b) by 1119 days.

(21) Appl. No.: 12/910,821

(22) Filed: Oct. 24, 2010

(65) Prior Publication Data

US 2011/0095523 A1 Apr. 28, 2011

Related U.S. Application Data

(60) Provisional application No. 61/254,598, filed on Oct. 23, 2009.

(51) Int. Cl.
*F16L 41/03* (2006.01)
*A62B 17/00* (2006.01)
*F28D 1/047* (2006.01)
*F28F 21/06* (2006.01)
*A41D 13/005* (2006.01)

(52) U.S. Cl.
CPC ............ *A62B 17/005* (2013.01); *F28D 1/0475* (2013.01); *F28F 21/062* (2013.01); *A41D 13/005* (2013.01)

(58) Field of Classification Search
USPC .......... 285/122.1, 125.1, 129.1, 130.1, 285.1, 285/120.1, 124.1, 131.1, 132.1, 133.5, 423, 285/923, 239
See application file for complete search history.

(56) References Cited

U.S. PATENT DOCUMENTS 461,891 A * 10/1891 Richardson ................ 285/125.1
534,029 A * 2/1895 Ball .............................. 165/101
2,108,759 A * 2/1938 Turman ......................... 252/511
2,548,788 A * 4/1951 Helme .......................... 239/110
3,610,323 A 10/1971 Troyer
3,760,842 A * 9/1973 Mikiya ......................... 137/557
3,791,679 A * 2/1974 Glover ....................... 285/132.1
4,691,762 A 9/1987 Elkins et al.
5,290,152 A * 3/1994 Wallace et al. ................. 417/68
5,320,164 A 6/1994 Szczesuil et al.
5,415,222 A 5/1995 Colvin et al.
5,538,583 A 7/1996 Szczesuil et al.
6,109,338 A 8/2000 Butzer
6,298,907 B1 10/2001 Colvin et al.
6,565,699 B1 5/2003 Szczesuil et al.
6,619,697 B2 * 9/2003 Griffioen et al. ........... 285/126.1
6,813,783 B2 11/2004 Szczesuil et al.
6,901,608 B2 6/2005 Szczesuil et al.
6,979,382 B2 12/2005 Szczesuil et al.
7,089,995 B2 8/2006 Koscheyev et al.
(Continued)

*Primary Examiner* — Aaron Dunwoody
*Assistant Examiner* — Fannie Kee
(74) *Attorney, Agent, or Firm* — Eleanor Musick; Musick Davison LLP

(57) ABSTRACT

A fitting for a fluid-circulating heat exchanging garment includes a cylindrical tube of flexible PVC extending from and integrally formed with a fluid-conducting chamber, the tube having a length, a distal portion with an inner diameter adapted to receive and closely fit a tubing end of a flexible PVC tubing, and a proximal portion with an inner diameter substantially equal to an inner diameter of the flexible PVC tubing, the cylindrical tube having a plurality of spaced apart radially-extending ribs extending the length of the tube and continuing to an outer surface of the fluid-conduction chamber. A manifold for heat exchanging garments has a central fluid-conducting chamber with a plurality of fittings extending therefrom and an inlet/outlet for connection to flexible tubing connected to a fluid circulating system.

19 Claims, 5 Drawing Sheets

(56) References Cited

U.S. PATENT DOCUMENTS

| | | | | |
|---|---|---|---|---|
| 7,124,593 | B2 | 10/2006 | Feher | |
| 7,277,614 | B2 * | 10/2007 | Cody et al. | 385/100 |
| 7,714,035 | B1 * | 5/2010 | Coe | 522/161 |
| 2009/0021003 | A1 * | 1/2009 | Poupore et al. | 285/131.1 |

* cited by examiner

FLEXIBLE FITTING FOR HEAT EXCHANGING GARMENTS

RELATED APPLICATIONS

This application claims the priority of U.S. Provisional Application No. 61/254,598, filed Oct. 23, 2009, which is incorporated herein by reference in its entirety.

FIELD OF THE INVENTION

The present invention relates to fittings and manifolds adapted for heat exchanging garments and more particularly to fittings and manifolds that provide improved flow of heat exchanging liquids.

BACKGROUND OF THE INVENTION

Members of the military, fire fighting personal, and others who are required to operate in extreme temperature environments, for example, in the desert, near fires, or at latitudes approaching the Polar Regions, frequently rely on garments that have heat exchanging liquids flowing therethrough in order to maintain a safe body temperature. In addition, workers in hazardous chemical, thermal and manufacturing environments must wear personal protective equipment (PPE) to minimize their exposure to hazardous substances, however, the PPE can limit the body's ability to shed excess heat. Flexible heat exchangers have proven to be one of the most effective methods of adding or extracting heat from the human body. These garments include flexible tubing that is sewn into the garment to carry cooling or heating fluids in close contact with the wearer's body. In general, heating or cooling garments are exemplified by U.S. Pat. Nos. 3,451,812; 3,425,486; 3,419,702; 4,691,762; 4,718,429; and 4,998,415. Other types of systems for body heating and cooling are illustrated in U.S. Pat. Nos. 4,114,620 and 5,062,424.

Most commonly, the tubing used in heat exchanging garments is standard, rigid PVC, which can be attached to the base fabric using any of three methods. The first and most common uses a standard zig-zag sewing machine with a custom foot to keep the tubing centered. The second method, which was introduced by NASA, uses a base garment formed from a mesh material with the tubing "woven" through the fabric. The third and most current method was developed at the U.S. Army Garrison-Natick. This microclimate cooling garment (MCG), which is described in U.S. Pat. No. 5,320,164 of Szczesuil, et al., uses specialty tooling and fabric to create a two layer lamination with the PVC tubing locked between the layers in a complex pattern employing ten separate flow circuits. The Natick technology is the most widely deployed to date.

No matter which construction method is used, all require the use of manifolds or miniature fittings to create individual flow circuits, thus minimizing back pressure and optimizing heat transfer. Manifolds that are currently in use are typically made from rigid polymers, such as polyamides, e.g., NYLON®. Most cooling garments use miniature barbed fittings that are inserted into the ends of the flexible tubing. Examples of the barbed fittings of the type used in the Natick MCG are shown in FIGS. 1*a*-1*c*. FIG. 1*c* illustrates a typical prior art tubing/manifold assembly with two four-port manifolds 2 and 4, for connection to inlet line 14 and outlet line 18, respectively, via barbed fittings 12 and 16. Manifold 2 has four ports 6*a*-6*d*, the barbed ends of which insert into tubes 8*a*-8*d*, respectively. The outlet ends of tubes 8*a*-8*d* are fitted over ports 10*a*-10*d* of manifold 4 after which the flexible tubing 8*a*-8*d* is secured to the manifold using a cyanoacrylate adhesive and a NYLON® cable tie (not shown). (The soft PVC tubing will not form a watertight seal unless an adhesive or sealant is used when joining the tubing to the manifold. Because there is considerable mechanical stress on the joint, the adhesive/sealant is prone to failure and a secondary clamp, such as a cable tie, must be used to minimize failures.) FIG. 1*a* illustrates an exemplary MCG rigid manifold which has a barbed inlet/outlet fitting 22, a distribution chamber 20 and a plurality of fittings 24*a*-24*j* which are dimensioned for insertion into the ends of flexible tubing (not shown). Whether discrete fittings or complex manifolds are used in heat transfer garments, there are two common issues: both are formed from rigid plastic, and both use hose barbs to secure the tubing. Details of a small section of a prior art rigid manifold are provided in FIG. 1*b* to illustrate the significant reduction in inner diameter at the hose barbs, which impairs the performance of the garments due to the reduced liquid flow (increased back pressure) at both the input and output manifolds. In the illustrated example, the inner diameter of inlet/outlet fitting 22 is 0.182 in. (4.62 mm) while the supply/return tubing has an inner diameter of 0.1875 in. (4.76 mm). At the tube fittings 24*a*-24*j*, each fitting has an inner diameter of 0.070 in. (1.78 mm), while the flexible tubing that runs through the garment has an inner diameter of 0.096 in. (2.4 mm). Thus, the manifold hose barb reduces the cross-sectional area of the supply/return tubing by ~10% to ~50% of the garment tubing.

Incompatibility in durometer (hardness) between the rigid manifold material and the flexible PVC tubing can produce a weaker joint. However, if the same fitting configuration were to be fabricated using PVC resin, it would require a thicker cross-section to achieve a strength similar to the current rigid polymer version. Additional drawbacks of such designs include the lack of conformability to the natural curvatures and movements of the human body, which can introduce strain on the tubing due to increased flexing near the manifold connections, increased garment wear near the location of the manifold, and possible discomfort for the user.

Accordingly, the need remains for fittings for effectively and efficiently connecting tubing to and within heat exchanging garments without negatively impacting their comfort and wear. The present invention is directed to such fittings and manifolds formed therefrom.

BRIEF SUMMARY OF THE INVENTION

It is an advantage of the present invention to provide a flexible fitting for connecting tubing to or within a heat exchanging garment without impairing liquid flow rate and, hence, the efficiency of the garment.

It is another advantage of the present invention to provide a manifold which incorporates such fittings for distributing heat exchanging liquid through a heating or cooling garment without negatively impacting the garment's comfort and wear.

Still another advantage of the invention is to provide fittings and manifolds that simplify the manufacturing process for heat exchanging garments while providing more reliable and robust connections for increased garment life.

In one aspect of the invention, a fitting for a fluid-circulating heat exchanging garment comprises a cylindrical tube of flexible PVC (normally 60 to 80 durometer Shore A) extending from and integrally formed with a fluid-conducting chamber, the tube having a length, a distal portion with an inner diameter adapted to receive and closely fit a tubing end of a flexible PVC tubing, and a proximal portion with an inner diameter substantially equal to an inner diameter of the flexible PVC tubing, the cylindrical tube having a plurality of spaced apart radially-extending ribs extending the length of the tube and continuing to an outer surface of the fluid-conduction chamber.

In another aspect of the invention, a fitting is a cylindrical tube formed from flexible PVC with at least a portion of its inner diameter adapted to closely fit the outer diameter of flexible tubing. The outer surface of the cylindrical tube has a plurality of axial ribs spaced around the circumference of the cylinder, typically with a uniform spacing, to provide additional rigidity to prevent bending of the fitting. In a preferred embodiment, the fitting will have two inner diameters, where the distal inner diameter matches the outer diameter of the flexible tubing, while the proximal inner diameter matches the inner diameter of the flexible tubing, so that changes in the flow cross-section are minimized, if not eliminated altogether. The junction between the distal inner diameter and the proximal inner diameter defines an insertion stop against which the end of the flexible tubing is pressed to produce a tight fit with uniform flow cross-sections. In one embodiment, the distal inner diameter of the fitting is sized to produce an interference fit with the outer surface of the flexible tubing. The compatibility between the materials of the fitting and the tubing make it possible to solvent bond or ultrasonically weld the components to form a reliable and repeatable liquid tight joint that requires no secondary means of fixation.

In another aspect of the invention, a manifold for a heat-exchanging garment, comprises a central fluid-conducting chamber formed from flexible PVC; an inlet/outlet integrally formed with the fluid-conducting chamber having an inner diameter adapted to receive and closely fit an end of a source/return flexible tubing in communication with a fluid circulating system; a plurality of ports extending from and integrally formed with the fluid conducting chamber, each port comprising: a cylindrical tube of flexible PVC, the tube having a length, a distal portion with an inner diameter adapted to receive and closely fit a tubing end of a flexible PVC tubing, and a proximal portion with an inner diameter substantially equal to an inner diameter of the flexible PVC tubing, the cylindrical tube having a plurality of spaced apart radially-extending ribs extending the length of the tube and continuing to an outer surface of the fluid-conduction chamber.

In an exemplary embodiment, the manifold for heat exchanging garments constructed according to the present invention comprises a central chamber with a plurality of integrally-formed cylindrical ports extending therefrom, where each port comprises a flexible PVC (polyvinylchloride) fitting having a distal end with an inner diameter adapted to receive the end of a circulating tube. The ports may extend at any angle appropriate for the particular garment design. In the preferred embodiment, each port may include axially extending ribs on its outer surface for increased strength to prevent crimping or excessive bending of the port. The inlet/outlet ends of the manifold are dimensioned to fit over the outer diameter of the source/return tubing. The inlet/outlet end includes a distal portion, with an inner diameter adapted to closely fit the outer diameter of the source/return tubing to produce an interference fit, and a proximal portion with an inner diameter that is close to or the same as the inner diameter of the source/return tubing. The junction between the distal portion and the proximal portion defines an insertion stop against which the end of the source/return tubing is pressed to produce a tight fit with uninterrupted flow cross-sections.

Using techniques that are well known in the art, PVC is made flexible and softer by adding plasticizer to the PVC resin during the molding process to improve its molecular mobility. In general, the more plasticizer that is used, the more flexible the resulting PVC will be.

The inventive flexible fitting and manifold provide a number of improvements over existing designs including increased conformability, reduced strain in the tubing, reduced back pressure, and reduced wear on the garment near the manifold. Further, assembly of heat exchanging garments is simplified and made more efficient because the extra step of applying a cable tie to each fitting can be eliminated.

DETAILED DESCRIPTION

As used herein, “fitting” and “port” mean a means for connection of flexible tubing to a fluid-conducting chamber.

As used herein, “fluid-conducting chamber” means any liquid tight hollow body through which a fluid may flow when connected to a fluid source, including but not limited to a manifold, a central distribution pipe, a connector, whether straight, elbow, T-shaped, quad, or other form, which may be used to link one piece of tubing to another piece of tubing, a valve, etc.

As used herein, “manifold” means a fluid-conducting chamber having a plurality of ports extending therefrom and a source/return for connecting the fluid-conducting chamber to a circulating fluid system.

As used herein, “heat exchanging garment” means wearable clothing items, including vests, jackets, sleeves, coats, shirts, suits, pants, coveralls, hoods, boots, gloves and any other type of complete or partial body covering, including blankets or tarps, that may be configured to support tubing in close contact with the body to carry a liquid for controlling body temperature by cooling or heating the body.

Figure 2:
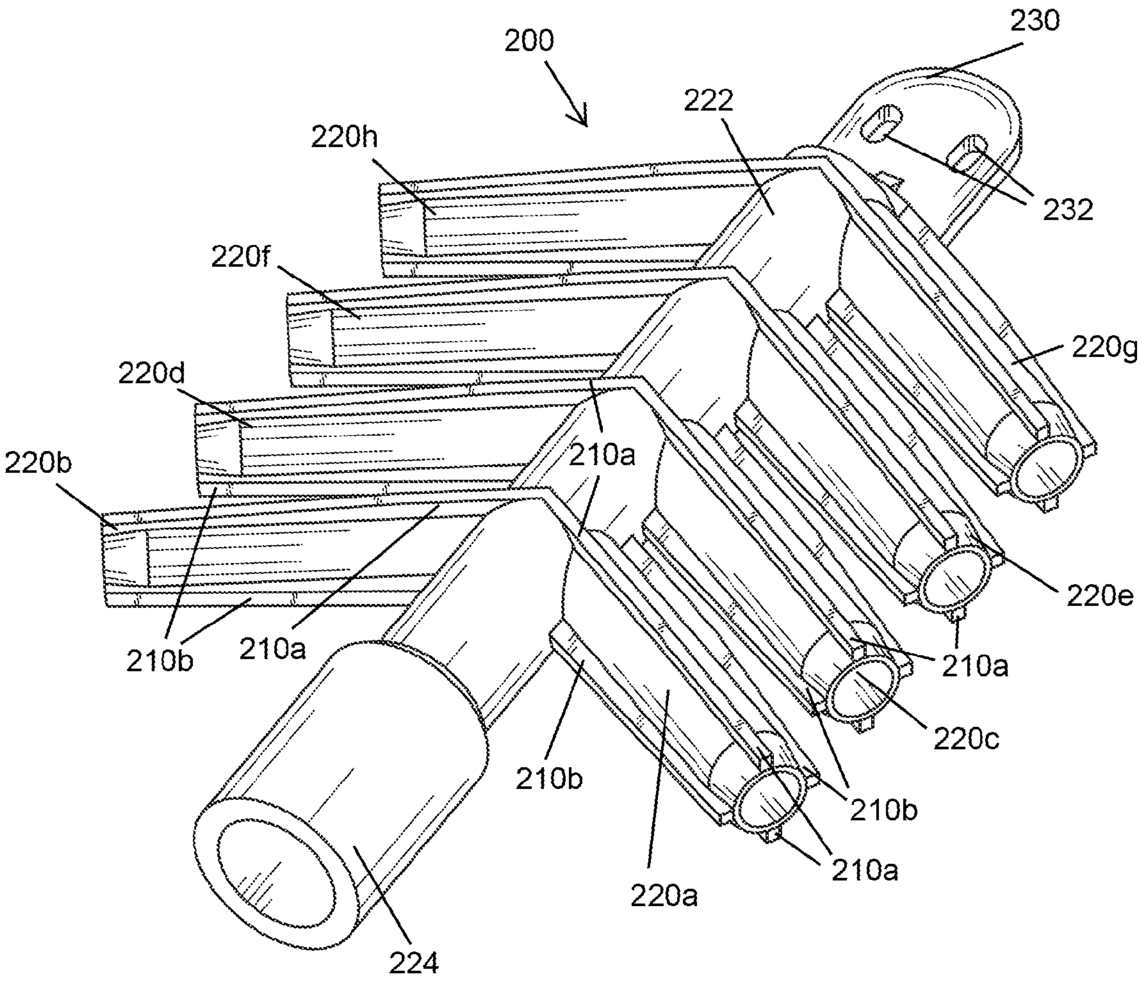
FIG. 2 is a diagrammatic perspective view of an 8-port manifold according to the present invention.
Figure 3:
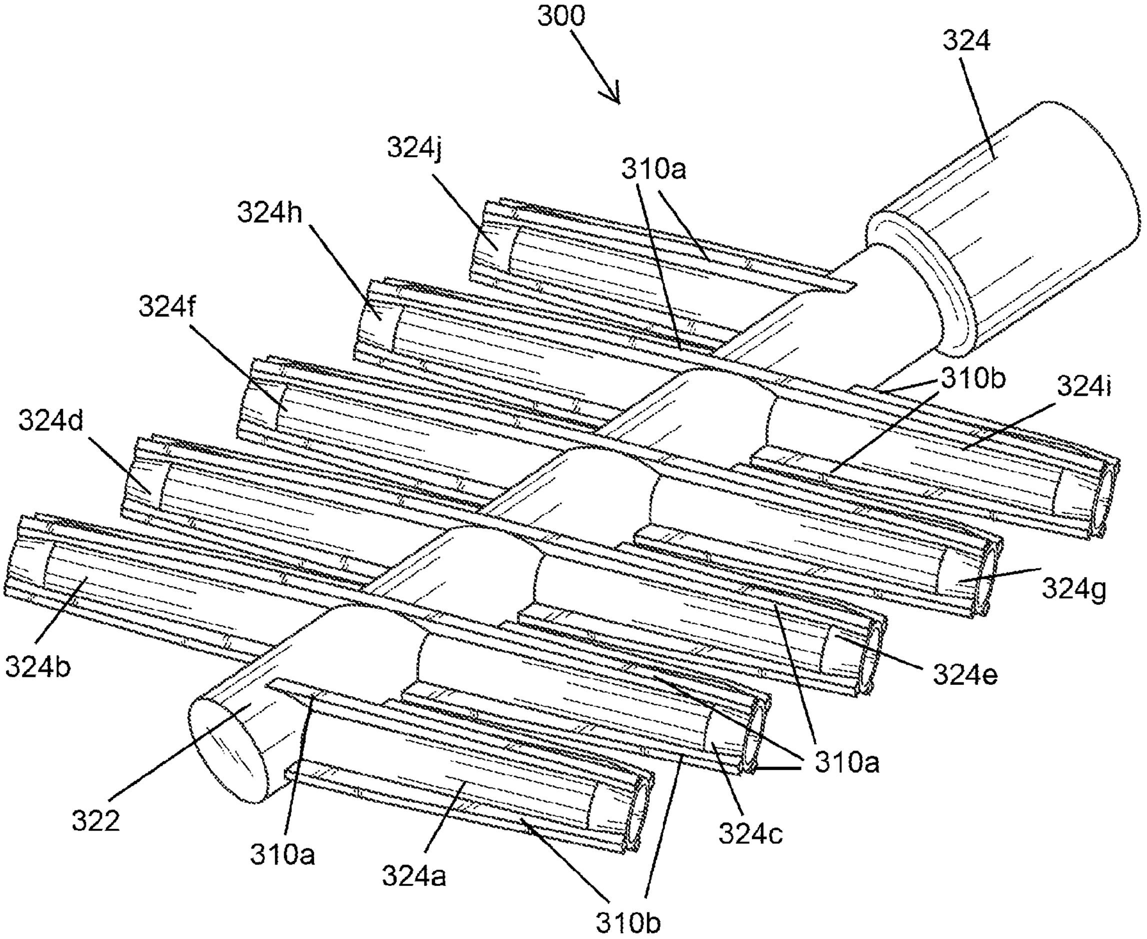
FIG. 3 is a diagrammatic perspective view of a 10-port manifold according to the present invention.
Figure 4:
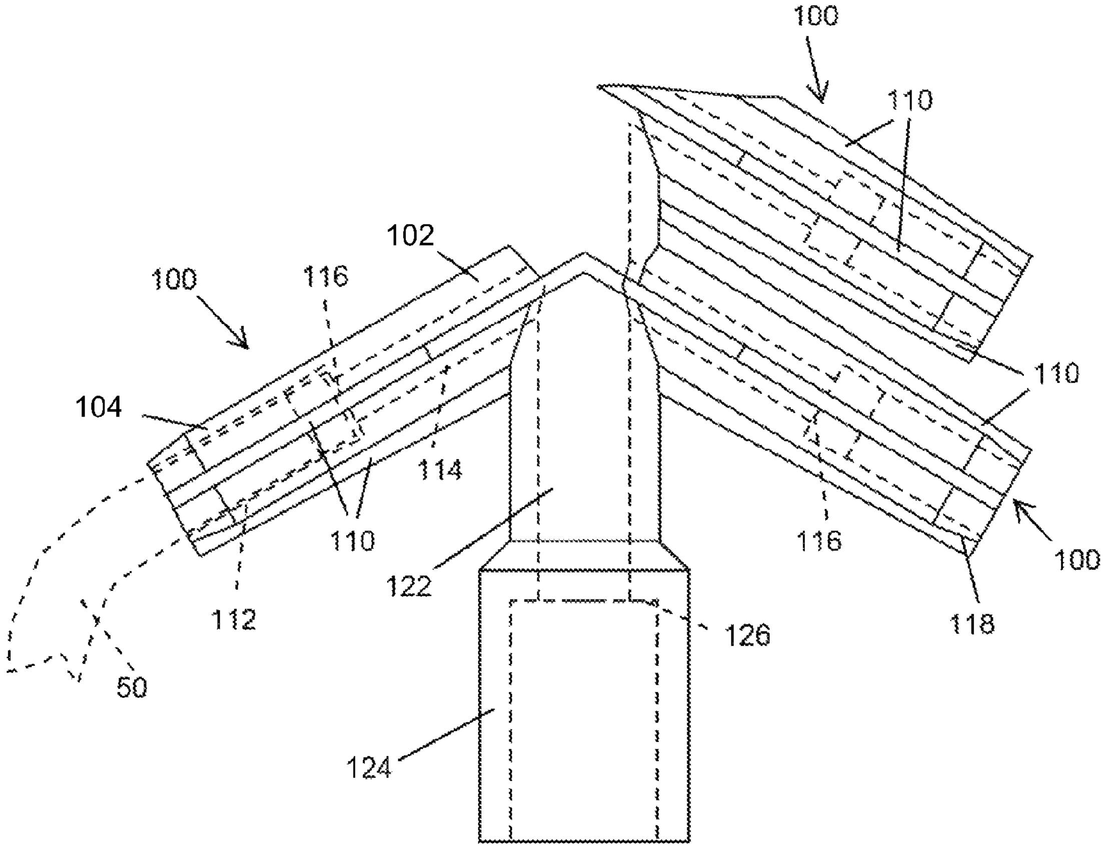
FIG. 4 is a side view of a portion of an inventive manifold.

Referring first to FIG. 4, a fitting 100 is a generally cylindrical tube formed from flexible PVC having a proximal end 102, which corresponds to the center of a connector, for example, where the fitting is integrally formed with a fluid-conducting chamber 122 to connect one tubing end with another tubing end, or where the fitting corresponds to a port of a manifold, as in the examples shown in FIGS. 2 and 3. The distal end 104 of the fitting has a distal inner diameter adapted to receive and closely fit the outer diameter of the end of flexible tubing 50. The outer surface of the cylindrical tube has a plurality of radially extending ribs 110 that run parallel to the tube’s axis, spaced around the circumference of the cylinder, typically with a uniform spacing, to provide additional rigidity to prevent bending of the fitting. In the examples illustrated in FIGS. 2 and 3, each fitting (manifold port) has four ribs—one rib located at each 90° around the circumference of the fitting. The ribs 110 may continue from the distal end 104 of the fitting to the other portion of the connector that is connected at its proximal end 102. For example, as illustrated by FIG. 2, the side ribs 210*a* of port

220*a* are formed continuously across the central body 222 of the manifold 200 to connect with the ribs of the opposite manifold port 220*b*, creating a chevron pattern. Similarly, as shown in FIG. 3, the ribs 310*a* define a straight line extending from the distal end of port 324*b* to the distal end of port 324*c*. The lengths of the ports are selected so that enough of the tubing end is captured to produce a reliable solvent-bonded joint. For example, the length of the distal inner diameter portion 112 of the fitting may be on the order of 0.3 in. to 0.6 in. (7.62 mm to 15.24 mm), while the length of the proximal inner diameter portion 114 may be of approximately equal length or slightly longer, depending on the angle at which the fitting extends from fluid-conducting chamber, e.g., manifold. The outer surface of the distal end 102 of the fitting may include a taper 118 to create a less abrupt transition from the flexible tubing to the fitting to reduce the chance of catching the edges on the garment fabric as the user moves as well as to provide additional strain relief to minimize potential kinking of the tubing.

In the preferred embodiment, a fitting 100 will have two inner diameters, where the distal inner diameter 112 matches the outer diameter of the flexible tubing 50, while the proximal inner diameter 114 matches the inner diameter of the flexible tubing, so that changes in the flow cross-section are minimized, if not eliminated altogether. The junction between the distal inner diameter and the proximal inner diameter defines an insertion stop 116 against which the end of the flexible tubing is pressed to produce a tight fit with uniform flow cross-sections. For a manifold, a junction 126 between inlet/outlet 124 and the central body 122 may perform a similar function. In one embodiment, the distal inner diameter 112 of the fitting is sized to produce an interference fit with the outer surface of the flexible tubing 50. Because of its low glass transition temperature flexible PVC readily bonds to other flexible PVC. This allows the fitting and tubing to be sealed to form a liquid tight joint by known methods, including solvent bonding and radiofrequency ("RF") or ultrasonic welding. The resulting seal is reliably formed without requiring a secondary means of fixation such as clamps or cable ties.

Referring to FIG. 2, an exemplary construction incorporating the above-described fittings is an 8-port manifold 200 for heat exchanging garments which includes a central chamber portion 222 with a plurality of integrally-formed cylindrical ports 220*a*-220*h* extending therefrom arranged in a herringbone arrangement, where each port comprises a flexible PVC fitting having a distal end with an inner diameter adapted to receive the end of a circulating tube, which is also flexible PVC. The ports may extend at any angle appropriate for the particular garment design. In the preferred embodiment, each port may include radially extending ribs 210*a* and 210*b* on its outer surface for increased strength to prevent crimping or excessive bending of the port. Ribs 210*a* continue from the distal ends of each port across the chamber portion 222 to connect to the rib 210*a* of the port on the opposite side. In the illustrated example, ribs 210*a* define a chevron. Ribs 210*b* are located 90° from ribs 210*a*. The proximal ends of ribs 210*b* intersect with the outer surface of chamber portion 222 to provide additional resistance to bending of the ports toward the chamber portion 222.

The inlet/outlet end 224 of the manifold 200 is dimensioned to fit over the outer diameter of the source/return tubing (not shown). To provide a uniform flow cross-section, the inlet/outlet end 224 has an inner diameter dimensioned to closely fit the outer diameter of the source/return tubing, while the inner diameter of the central chamber portion 222 generally matches the inner diameter of the source/return tubing. The junction between the inlet/outlet end 224 and the central chamber portion 222 defines an insertion stop against which the end of the source/return tubing is butted. As with the fittings, attachment to the flexible source/return tubing at the inlet/outlet end 224 is made liquid tight by way of solvent bonding, ultrasonic or RF welding, or other attachment means that are known in the art.

Using techniques that are well known in the art, PVC is made flexible and softer by adding plasticizer to the PVC resin during the molding process to improve its molecular mobility. Examples of common plasticizers include dioctyl phthalate (DOP), di-iso-octyl phthalates (DIOP) and dialphanyl phthalate (DAP), however other plasticizers are known, and combinations of different plasticizers may be used. In general, the more plasticizer that is used the more flexible the resulting PVC will be. The manifolds and fittings according to the present invention are formed using techniques that are well known in the art, such as blow molding, injection molding, extrusion, etc.

Figure 1A:
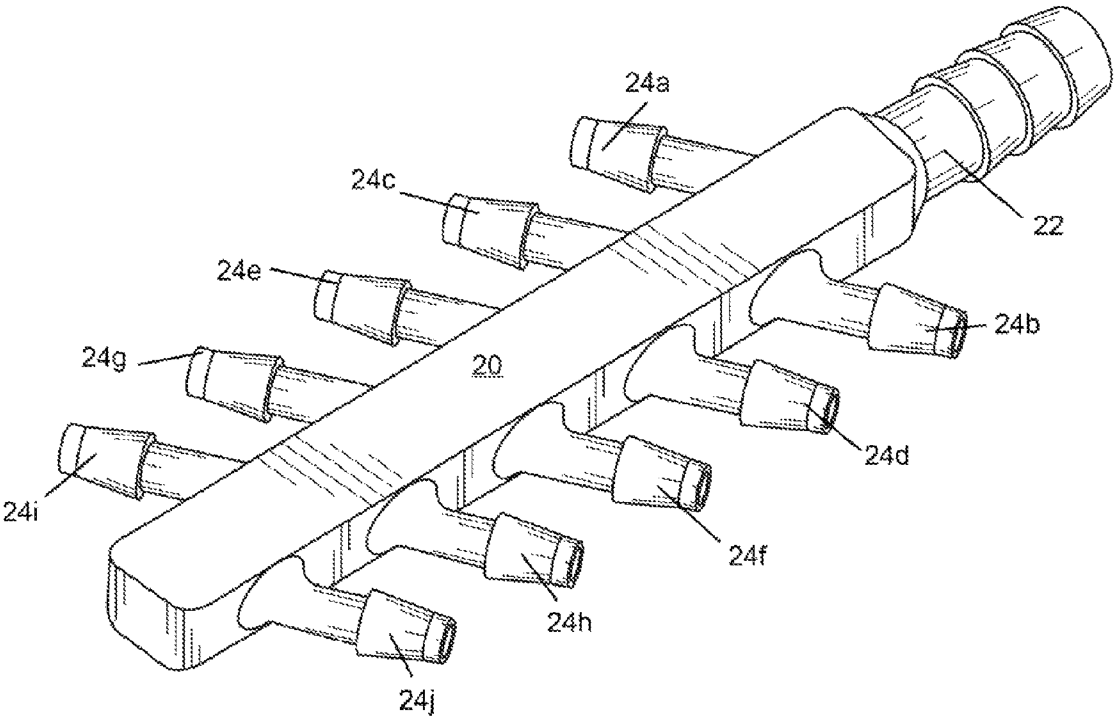
FIG. 1a (Prior Art)
FIG. 1*a* is a diagrammatic perspective view of a prior art manifold.
Figure 1B:
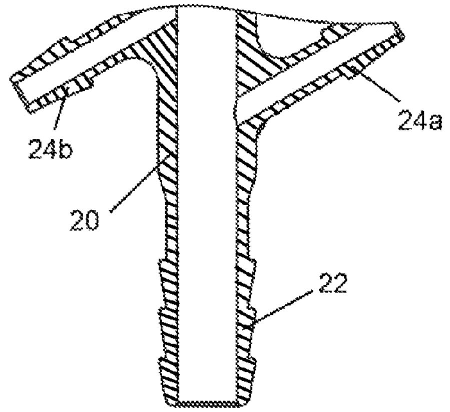
FIG. 1b (Prior Art)
FIG. 1*b* is a cross-sectional view of a section of a prior art manifold with barbed connections.
Figure 1C:
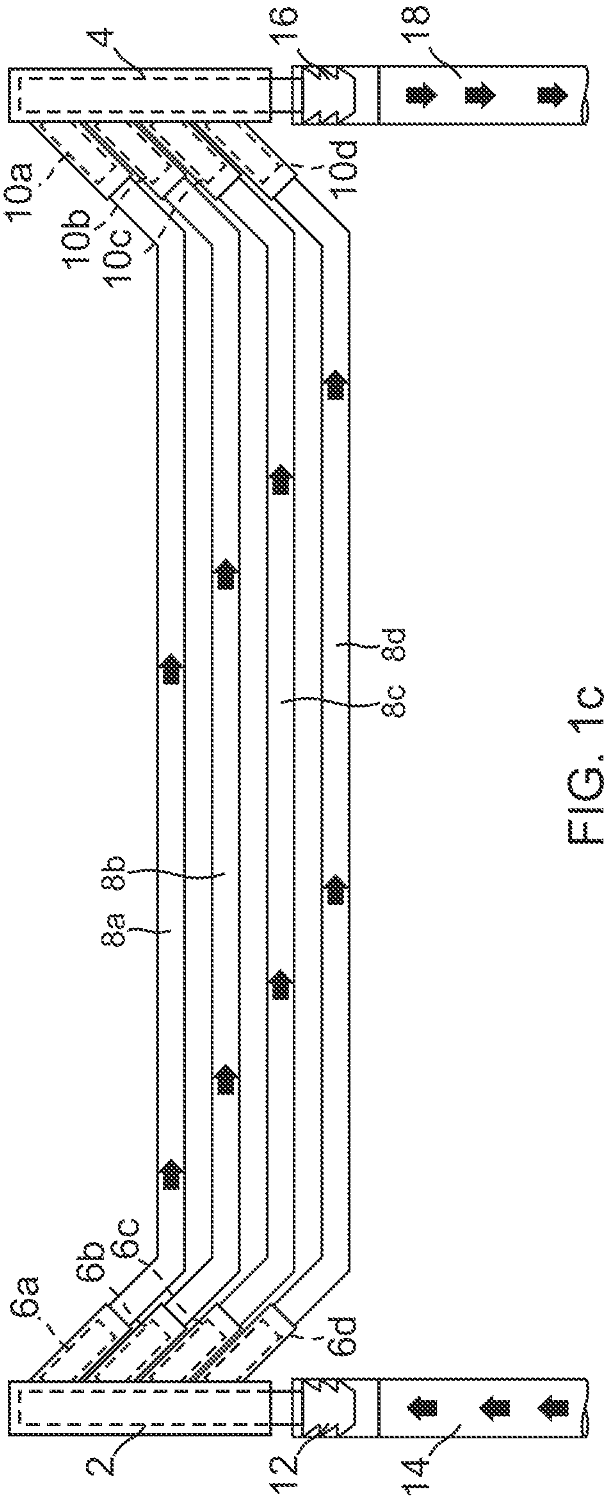
FIG. 1c (Prior Art)
FIG. 1*c* is a diagrammatic view of an exemplary prior art tubing and manifold assembly.

The manifold end that is opposite the inlet/outlet end 224 may optionally have an extension 230 that is integrally formed to provide means for attachment of the manifold to the garment fabric. As illustrated, the manifold 200 may be attached by way of thread, staples, wires or other attachment means that can be inserted through the openings 232. The extensions may be formed at different locations of the manifold depending on the type of garment, orientation of the manifold, and the liquid source location. For example, in an arrangement similar to that shown in FIG. 1*c*, the manifold 200 will typically be oriented vertically with the extension 230 at the top and inlet/outlet end 224 at the bottom when used in a jacket, vest or other upper body garment. As will be readily apparent, the manifold may be located as appropriate for the particular garment in which is it used and the location of the pump and reservoir that circulate the heat exchanging liquid.

FIG. 3 illustrates an exemplary 10-port manifold 300 constructed with using the flexible PVC fittings as ports 324*a-j*. As above, fittings 324*a-j* are integrally formed with the central chamber 322 from flexible PVC. In this example, the ports on opposite sides of the central chamber 322 define a straight line. Each port may include radially extending ribs 310*a* and 310*b* on its outer surface running the full length of the port for increased strength to prevent crimping or excessive bending of the port. Ribs 310*a* continue from the distal ends of each port across the chamber portion 322 to connect to the rib 310*a* of the port on the opposite side, if any. In the illustrated example, the ribs 310*a* for ports 324*b* and 324*c* define a continuous straight line. Ribs 310*b* are located 90° from ribs 310*a*. The proximal ends of ribs 310*b* intersect with the outer surface of chamber portion 322 to provide additional resistance to bending of the ports toward the chamber portion 322.

The inlet/outlet end 324 of manifold 300 is dimensioned to fit over the outer diameter of the source/return tubing (not shown). To provide a uniform flow cross-section, the inlet/outlet end 324 has an inner diameter dimensioned to closely fit the outer diameter of the source/return tubing, while the inner diameter of the central chamber portion 322 generally matches the inner diameter of the source/return tubing. The junction between the inlet/outlet end 324 and the central chamber portion 322 defines an insertion stop against which the end of the source/return tubing is butted. As with the fittings, attachment to the flexible source/return tubing at the inlet/outlet end 324 is made liquid tight by way of solvent bonding, ultrasonic or RF welding, or other attachment means that are known in the art.

The manifolds illustrated in the figures and described herein are provided as examples only. It will be readily apparent to those of skill in the art that different size and shape manifolds with different numbers and arrangements of ports may be used in different types of garments or other heat exchanging items, such as blankets or pads that might be used in medical treatment of hypo- or hyperthermia.

The inventive flexible fitting and manifold provide a number of improvements over existing devices that are currently in use in heat exchanging garments. These improvements include increased conformability, reduced strain in the tubing, reduced back pressure, and reduced wear on the garment near the manifold. The inventive manifold may be deployed in any configuration from a simple coupling to a manifold with almost unlimited ports.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

The invention claimed is:

1. A fluid distribution assembly in a heat-exchanging garment that at least partially covers and conforms to a wearer's body, the assembly comprising:

- a plurality of flexible heat-exchanging tubes, each heat-exchanging tube having an inner tubing diameter defining a tubing flow cross-section, an outer tubing diameter, a first end and a second end, each heat-exchanging tube configured for attachment within the heat-exchanging garment;
- a source/return tube in communication with a fluid circulating system; and
- at least one manifold comprising:
  - a central fluid-conducting chamber formed from flexible polyvinylchloride (PVC);
  - an inlet/outlet integrally formed with the central fluid-conducting chamber having an inner diameter configured for insertion of and to closely fit an end of the source/return tube;
  - a plurality of ports extending from and integrally formed with the central fluid conducting chamber, each port comprising:
    - a cylindrical tube of flexible PVC-, the cylindrical tube having a length, a distal port portion with a distal inner diameter substantially equal to the outer tubing diameter, the distal portion configured for insertion of and to closely fit one of the first end and the second end of the heat-exchanging tube, and a proximal port portion with a proximal inner diameter smaller than the distal inner diameter and substantially equal to the inner tubing diameter to define a uniform and continuous port flow cross-section substantially equal to the tubing flow cross-section, the cylindrical tube having a plurality of spaced apart radially-extending ribs extending the length of the cylindrical tube and continuing to an outer surface of the central fluid conducting chamber.

2. The fluid distribution assembly of claim 1, wherein an outer surface of the cylindrical tube is tapered at the end of the distal portion.

3. The fluid distribution assembly of claim 1, further comprising an extension configured for affixing the manifold within the heat-exchanging garment.

4. The fluid distribution assembly of claim 1, wherein the flexible PVC of the cylindrical tube and the central fluid-conducting chamber has a hardness in the range of 60 to 80 durometer Shore A.

5. A fluid distribution assembly in a heat-exchanging garment, the assembly comprising:

- a plurality of flow circuits, each flow circuit comprising a section of flexible polyvinylchloride (PVC) tubing, the flexible PVC tubing having an outer tubing diameter and an inner tubing diameter defining a tubing flow cross-section;
- a source/return tubing in communication with a fluid circulating system; and
- a pair of manifolds, each manifold comprising:
  - a central chamber formed from flexible PVC, the central chamber having an inner diameter;
  - an inlet/outlet integrally formed with the central chamber, the inlet/outlet having an inner diameter configured for insertion of and to closely fit an end of the source/return flexible tubing;
  - a plurality of ports extending from and integrally formed with the central chamber, each port comprising:
    - a cylindrical tube having a distal portion inner diameter and a proximal portion inner diameter that meet at a junction, the distal portion inner diameter being substantially equal to the outer tubing diameter and is configured for insertion of and to closely fit an end of the section of the flexible PVC tubing, and the proximal portion inner diameter being substantially equal to the inner tubing diameter to define a uniform port flow cross-section substantially equal to the tubing flow cross-section, the junction defining an insertion stop for the end of the section of the flexible PVC tubing, wherein the cylindrical tube is formed from flexible PVC and further comprises a plurality of ribs extending the length of the tube, and wherein a distal portion of an outer surface of the cylindrical tube is tapered to a smaller diameter to provide a transition from the outer tubing diameter of the section of the flexible PVC tubing to the outer surface of the cylindrical tube;
- wherein each port of one manifold of the pair is connected by a section of flexible PVC tubing to a corresponding port of the other manifold.

6. The fluid distribution assembly of claim 5, further comprising an extension configured for affixing each manifold within the heat-exchanging garment.

7. The fluid distribution assembly of claim 5, wherein each rib of the plurality of ribs attaches to and extends from an outer surface of the central chamber to a distal end of the cylindrical tube.

8. The fluid distribution assembly of claim 5, wherein the plurality of ports extend from the central chamber in a herringbone arrangement.

9. The fluid distribution assembly of claim 5, wherein the flexible PVC of the cylindrical tube has a hardness in the range of 60 to 80 durometer Shore A.

10. The fluid distribution assembly of claim 5, wherein the inner diameter of the central chamber matches an inner diameter of the source/return flexible tubing to form a substantially uniform flow cross-section.

11. The fluid distribution assembly of claim 5, wherein the section of the flexible PVC tubing is affixed within the cylindrical tube by solvent bonding, radio frequency (RF) or ultrasonic welding.

12. A fluid distribution assembly for distributing fluid within a heat-exchanging garment, the assembly comprising:

source/return tubing in fluid communication with a fluid circulating system, the source/return tubing having an inner diameter; and a plurality of flow circuits comprising a pair of manifolds and a plurality of sections of flexible tubing connecting the pair of manifolds, the flexible tubing formed from flexible polyvinylchloride (PVC) and having an outer tubing diameter and a tubing flow cross-section, each manifold comprising:

a central chamber formed from flexible PVC, the central chamber having a central chamber inner diameter;

an inlet/outlet integrally formed with the central chamber, the inlet/outlet having an inlet/outlet inner diameter configured for insertion of and to closely fit an end of the source/return flexible tubing;

a plurality of ports extending from and integrally formed with the central chamber, each port comprising:

a cylindrical tube having a length and an internal insertion stop defined by a junction between a distal portion inner diameter and a proximal portion inner diameter smaller than the distal portion inner diameter, the distal portion inner diameter being substantially equal to the outer tubing diameter and is configured for insertion of and to closely fit an end section of the flexible tubing, and the proximal portion inner diameter defining a uniform port flow cross-section substantially equal to the tubing flow cross-section;

wherein one of the pair of manifolds comprises an inlet for introducing fluid into the plurality of flow circuits and the other of the pair of manifolds comprises an outlet for removing fluid from the plurality of flow circuits.

13. The fluid distribution assembly of claim 12, wherein the cylindrical tube further comprises a plurality of ribs extending the length of the tube.

14. The fluid distribution assembly of claim 12, wherein the central chamber inner diameter matches the inner diameter of the source/return flexible tubing to define a substantially uniform flow cross-section from the source/return flexible tubing to the central chamber.

15. The fluid distribution assembly of claim 12, wherein a distal portion of an outer surface of the cylindrical tube is tapered to a smaller diameter to define a transition from an outer surface of the flexible tubing to the outer surface of the cylindrical tube.

16. The fluid distribution assembly of claim 12, wherein the plurality of ports extend from the central chamber in a herringbone arrangement.

17. The fluid distribution assembly of claim 12, wherein the cylindrical tube comprises flexible PVC which has a hardness in the range of 60 to 80 durometer Shore A.

18. The fluid distribution assembly of claim 12, wherein the flexible PVC tubing is affixed within the cylindrical tube by solvent bonding, radio frequency (RF) or ultrasonic welding.

19. The fluid distribution assembly of claim 12, further comprising an extension configured for affixing each manifold within the heat-exchanging garment.

* * * * *